United States Patent [19]

Flowerday

[11] Patent Number: 4,624,499

[45] Date of Patent: Nov. 25, 1986

[54] VISOR WITH PIVOTED CONCEALED VANITY MIRROR

[75] Inventor: Carl W. Flowerday, Holland, Mich.

[73] Assignee: Prince Corporation, Holland, Mich.

[21] Appl. No.: 718,716

[22] Filed: Apr. 1, 1985

[51] Int. Cl.$^4$ ................................................ B60J 3/00
[52] U.S. Cl. ................................ 296/97 H; 296/97 G; 350/406; 362/144
[58] Field of Search ............... 296/97 H, 97 C, 97 G, 296/97 R; 350/404, 406; 362/144

[56] References Cited

U.S. PATENT DOCUMENTS

| | | | |
|---|---|---|---|
| 1,775,486 | 9/1930 | Clements | 296/97 C |
| 2,107,247 | 2/1938 | Johnson | 296/97 G |
| 2,163,495 | 6/1939 | Levy | 296/97 R |
| 2,685,336 | 8/1954 | Menighan | 296/97 R |
| 2,755,126 | 7/1956 | Ludlow | 296/97 R |
| 2,894,576 | 7/1959 | Williams | 296/97 C |
| 3,158,396 | 11/1964 | Berger | 296/97 G |
| 3,336,073 | 8/1967 | Berger | 296/97 G |
| 3,877,745 | 4/1975 | Girard | 296/97 C |
| 4,003,597 | 1/1977 | Acuff | 296/97 C |
| 4,486,819 | 12/1984 | Marcus et al. | 296/97 H |

FOREIGN PATENT DOCUMENTS 3222194 12/1983 Fed. Rep. of Germany .

*Primary Examiner*—Robert R. Song
*Attorney, Agent, or Firm*—Price, Heneveld, Huizenga & Cooper

[57] ABSTRACT

A visor includes a body having a recess with an access opening along a lower edge of the visor. A generally rectangular vanity mirror panel assembly is pivotally coupled to the visor body to pivotally move from a stored position within the recess to a use position extending from the recess. The resultant structure provides a useful mirror lowered below the visor in a convenient location for use and having an aspect ratio conforming to that of a person's face.

23 Claims, 10 Drawing Figures

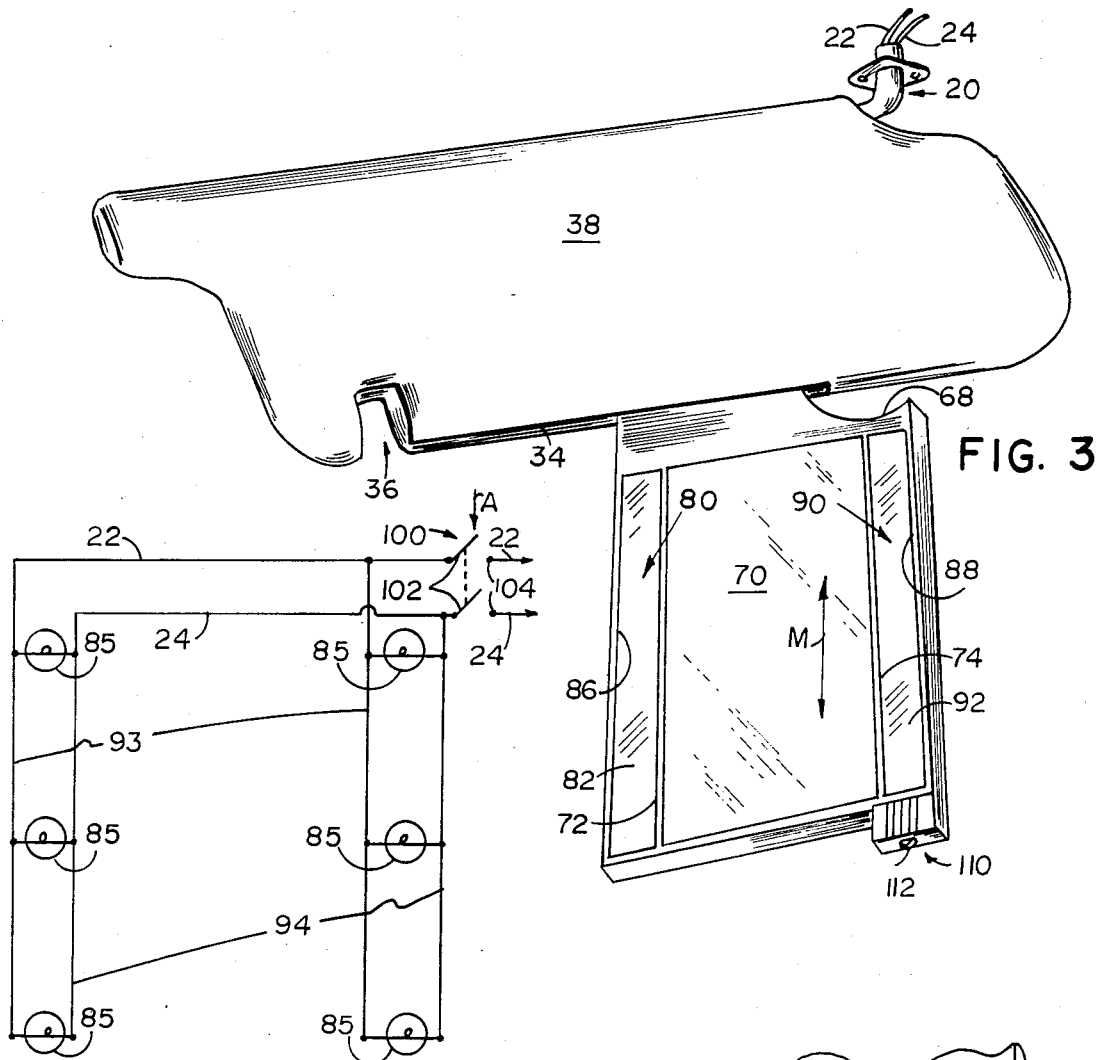
FIG. 3
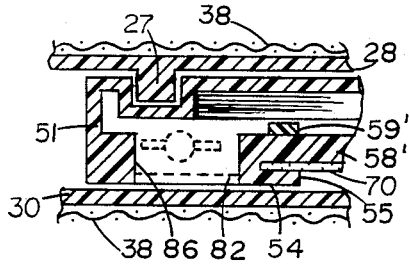
FIG. 8
FIG. 6
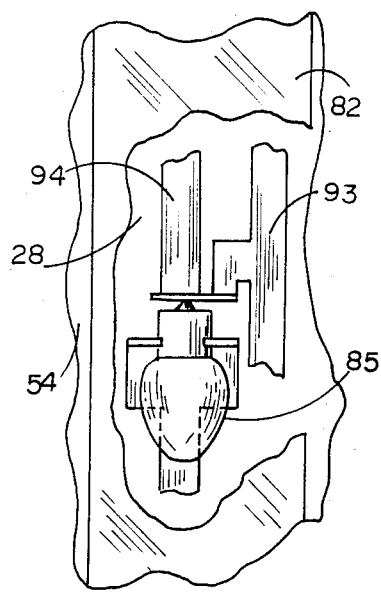
FIG. 7

VISOR WITH PIVOTED CONCEALED VANITY MIRROR

BACKGROUND OF THE INVENTION

The present invention pertains to automotive visors with vanity mirrors.

U.S. Pat. No. 4,227,241 discloses a covered illuminated vanity mirror integrally built into a visor body. Such visors have become popular standard equipment on many vehicles. U.S. Pat. No. 4,486,819 discloses a visor having an illuminated vanity mirror which slides out from a lower edge of the visor for use. Both of these visors have somewhat elongated, rectangular mirrors which have their major axis extending horizontally when in a use position. The mirrors thus provide a fairly short and wide reflected image. As a result, typically, only a portion of ones face can be viewed at any time.

SUMMARY OF THE PRESENT INVENTION

The vanity mirror and visor of the present invention provide a vanity mirror which pivots downwardly and outwardly from the visor body on an axis orthogonal to the visor body. The generally rectangular mirror in the preferred embodiment of the invention moves from a stored position within a recess to a lowered use position with its major axis extending vertically. The aspect ratio of the mirror thus more closely conforms to that of a person's face and permits a person to simultaneously view their entire face during use instead of moving their head to see, for example, first their hair then their eyes and finally, their mouth and chin area. In a preferred embodiment of the invention, the vanity mirror is illuminated by elongated, relatively narrow light sources extending along the sides of the mirror.

Visors embodying the present invention include a visor body having a recess with an access opening along a lower edge of the visor. A generally rectangular vanity mirror panel assembly is pivotally coupled to the visor body to pivotally move from a stored position within the recess to a use position extending from the recess. The resultant structure provides a useful mirror lowered below the visor in a convenient location for use and having an aspect ratio conforming to that of a person's face.

These and other features, objects and advantages of the present invention will become apparent upon reading the following description thereof together with reference to the accompanying drawings in which:

BRIEF DESCRIPTION OF THE DRAWINGS

FIG. 3 is a perspective view of the visor shown in FIG. 1 with the illuminated vanity mirror in the lowered use position;

FIG. 6 is an enlarged, fragmentary, cross section taken along section line VI—VI of FIG. 4;

FIG. 7 is an enlarged, fragmentary, front elevational view of a portion of the illumination means employed in the preferred embodiment of the present invention;

FIG. 8 is an electrical circuit diagram in schematic form of the illumination circuit employed in the preferred embodiment of the present invention;

DETAILED DESCRIPTION OF THE PREFERRED EMBODIMENT

Figure 1:
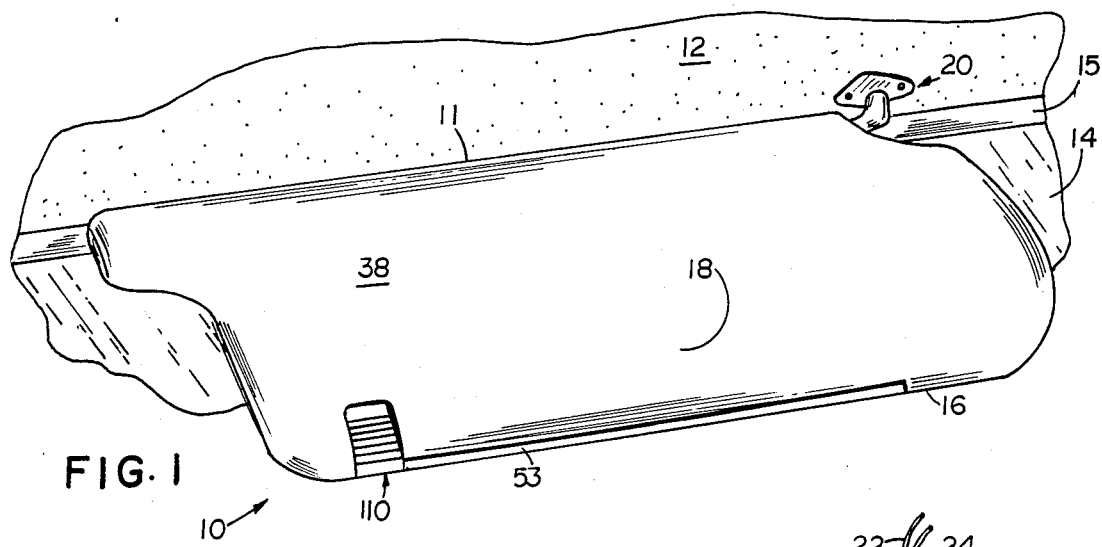
FIG. 1 is a perspective view of a visor embodying the present invention installed in a vehicle and shown in a lowered position.
Figure 2:
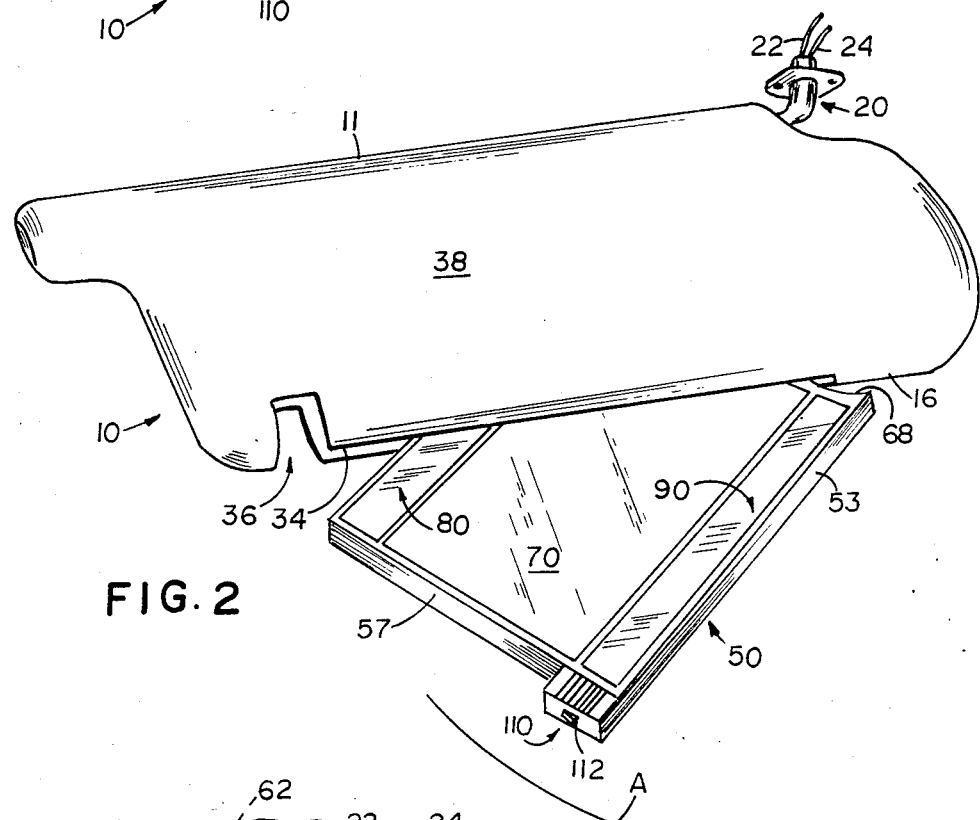
FIG. 2 is a perspective view of the visor shown in FIG. 1 with the illuminated vanity mirror partially withdrawn from the visor body.

Referring initially to FIGS. 1–3, there is shown a preferred embodiment of the invention comprising a visor 10 which, as seen in FIG. 1, is mounted to the roof 12 of a vehicle on the passenger side just above the vehicle windshield 14. The visor, as seen in FIGS. 1–3, is shown in a lowered use or sun blocking position and in this position, includes an upper edge 11 extending generally parallel to the trim 15 between the vehicle roof 12 and windshield 14. The visor also has a lower edge 16 and a rear surface 18 which faces toward the vehicle occupant when the visor is in the lowered use position, as illustrated. The visor 10 is mounted to the vehicle through an elbow bracket assembly 20 which is secured within the visor by a visor control torque fitting which can be of the type disclosed in U.S. Pat. No. 4,500,131, the disclosure of which is incorporated herein by reference.

The pivot arm assembly 20 secures the visor to the vehicle roof 12 permitting the visor to be moved between a lowered use position, as illustrated, and a raised stored position and held securely in either of these positions or any adjustable intermediate position. The elbow assembly 20 is, in the embodiment shown, hollow to permit a pair of conductors 22 and 24 to extend therethrough and attach to the vehicle's electrical system for providing operating power to the illuminated vanity mirror panel assembly 50, as described in greater detail below in conjunction with FIGS. 5, 7 and 8.

Figure 5:
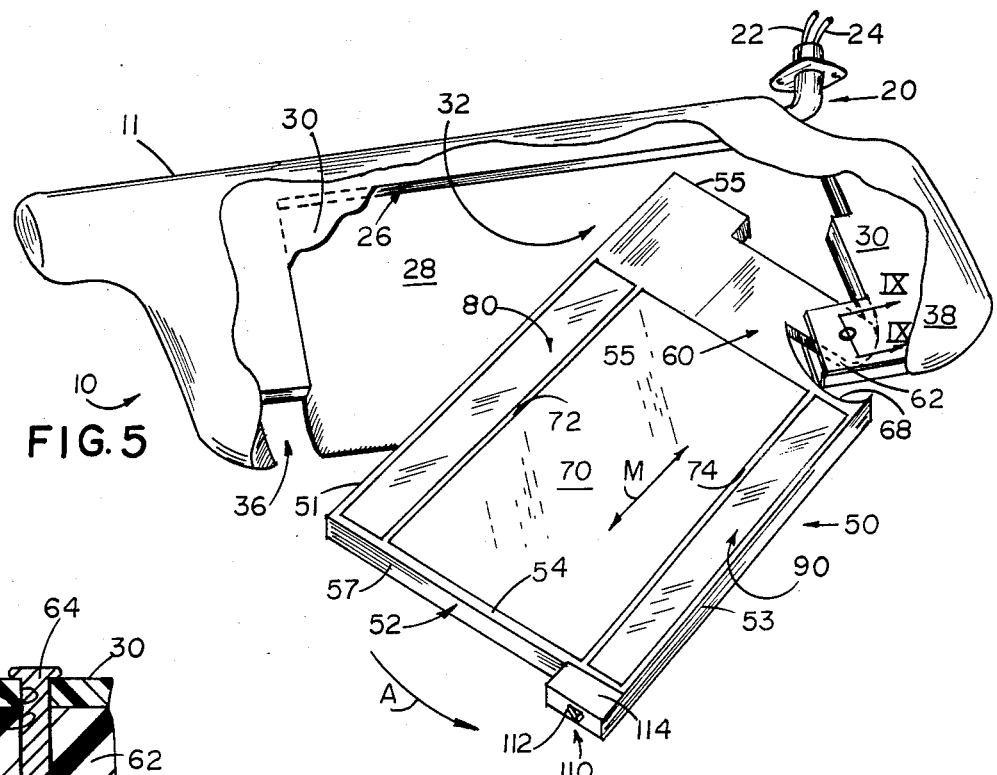
FIG. 5 is a rear perspective view of the visor shown in FIG. 3.
Figure 4:
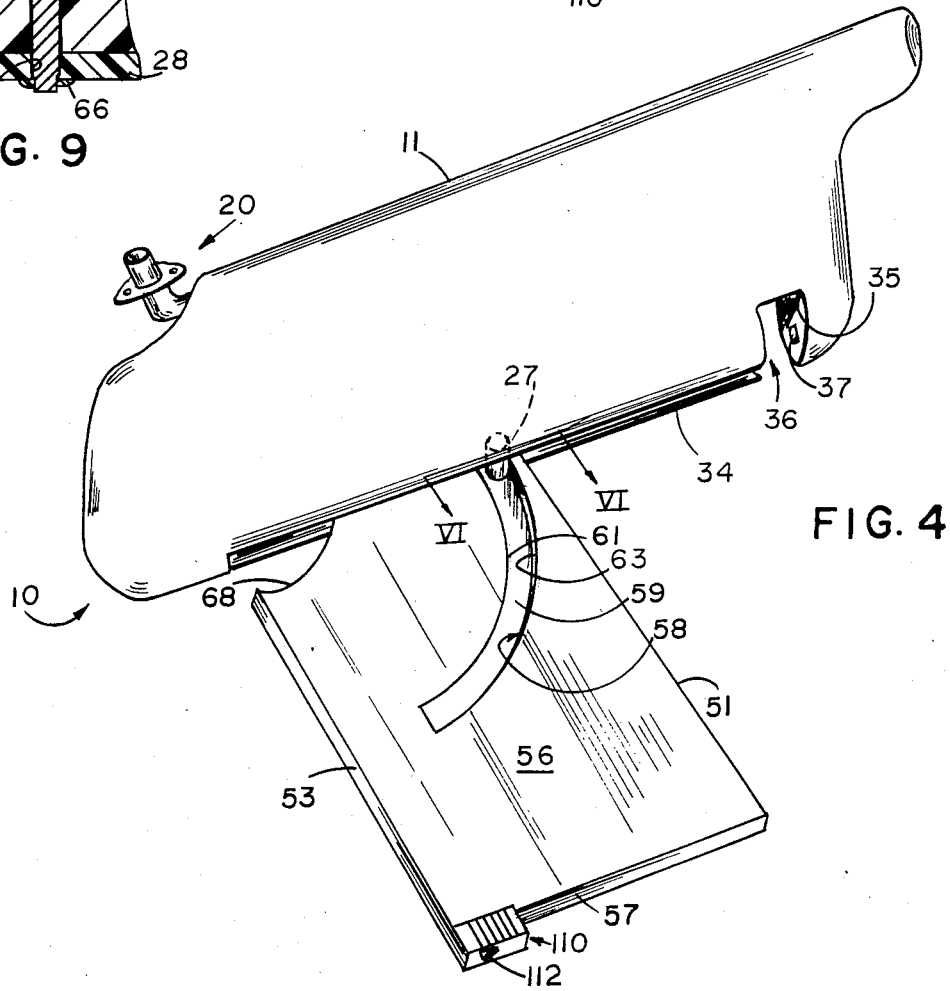
FIG. 4 is a perspective, partially broken away view of the visor of FIG. 1 showing the mounting of the illuminated vanity mirror assembly to the visor body.

The visor includes a visor body or core 26 (as best seen in FIG. 5) which can be molded of a polymeric material such as polypropylene formed in two halves including a front wall 28 and a rear wall 30. The visor body includes a recess 32 for receiving the pivotally mounted panel assembly 50. In the embodiment shown, recess 32 defines a generally rectangular storage compartment within the visor body. An access opening 34 communicates with compartment 32 and extends along a portion of the lower edge 16 of the visor, as best seen in FIG. 2. The visor body 26 also includes a latch recess 36 including, as seen in FIG. 4, a sidewall 35 having an aperture 37 formed therein for receiving a locking dog 112 associated with the latch 110 of the illuminated vanity mirror panel assembly 50, as described below. The visor body or core 26 is covered with a suitable upholstery fabric 38 to conform the visor appearance to that of the upholstery of the vehicle in which the visor is installed.

Figure 9:
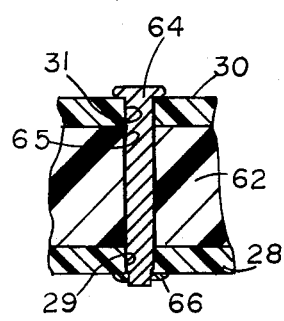
FIG. 9 is an enlarged, fragmentary, cross-sectional view of the pivot mounting means taken along section lines IX—IX of FIG. 5.

The vanity mirror panel assembly 50 includes a frame 52 (FIG. 5) which is generally rectangular and made of an integrally molded polymeric material such as a polycarbonate. Frame 52 includes sidewalls 51 and 53, a front wall 54, rear wall 56 and upper and lower edges 55 and 57, respectively. The upper end of frame 52 includes an integral mounting bracket 60 defined by an extending mounting flange 62 which fits between panels 28 and 30 of the visor body, as best seen in FIGS. 5 and 9, and is pivotally coupled to the visor body between its panels by means of a pivot pin 64. Pin 64 extends through an aperture 31 in panel 30 through an aperture 65 in flange 62 and an aperture 29 in panel 28 and is secured therein by means of a suitable fastening nut 66 to permit the illuminated vanity mirror panel 50 to pivot with respect to the visor body between the stored position, illustrated in FIG. 1, and the lowered use position, illustrated in FIG. 3.

The integral mounting bracket 60 also includes a crescent-shaped slot 68 formed through the solid integral mounting bracket 60 to partially circumscribe arm 62 and provide clearance around the visor body, as best seen in Fig. 5, for the panel assembly as it is extended to the lowered use position. This clearance maximizes the available space for use of a mirror 70 in panel assembly 50. The mirror is secured to the rear of front panel 54 behind a generally rectangular aperture 55 (FIG. 5) formed therein by means of a backing panel 58' and suitable heat stake tabs 59' extending along the peripheral edges of the mirror. Backing panel 58 (FIG. 6) provides safety protection through an adhesive and/or cushioned surface interface between it and the mirror. Panel 58 is also supported around the periphery of opening 55 in front wall 54 by suitable tabs 59. Mirror 70 is generally rectangular and includes a major axis identified by arrows M in FIGS. 3 and 5 which extends generally vertically when the mirror is in the lowered use position, as seen in FIG. 3. The dimensions of the mirror provide an aspect ratio of about 1.5×2 to 2×3 (width to height) which generally conforms to the aspect ratio of an average individual's face. As such, with the mirror oriented, as seen in FIG. 3, a person using the mirror can simultaneously view substantially their entire facial area.

Adjacent the side edges 72 and 74 (FIG. 5) of mirror 70 are elongated, narrow, rectangular illumination means 80 and 90 in the preferred embodiment. Illumination means 80 and 90 each include a transparent lens 82 and 92, respectively, for directing illumination outwardly from lamps 85 (FIGS. 7 and 8) positioned behind each of the lenses and in spaced relationship to provide even illumination for use of the mirror. Lenses 82 and 92 can be of the Fresnel-type disclosed in U.S. Pat. No. 4,227,241 to direct light outwardly and toward the center and in front of the mirror for even illumination of a person's face when using the mirror. The lamps are supported by integral sockets and conductors 93 and 94 which are disclosed in greater detail in U.S. Pat. No. 4,486,819, the disclosure of which is incorporated herein by reference.

Figure 10:
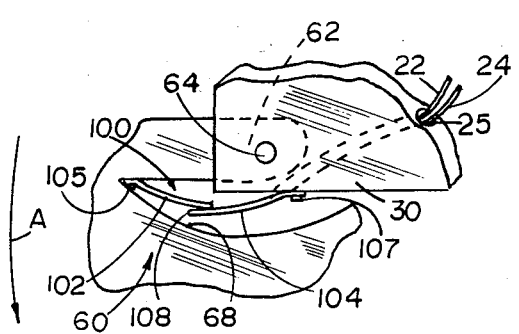
FIG. 10 is an enlarged, fragmentary, front elevational view of the switch associated with the visor of the present invention.

Conductors 93 and 94 extend along and behind lenses 82 and 92 and are secured to the front wall 28 of the frame 50 in a conventional manner as by heat staking to apertures formed in the flat conductors 93 and 94 at spaced locations. The lenses 82 and 92 are snap-mounted to the edges of the elongated, rectangular apertures 86 and 88 formed in front wall 54 of frame 50 to provide access for removal and replacement of lamps 85 as required. Conductive strips 93 and 94 are coupled to a pair of flexible conductors 22 and 24, as shown in FIGS. 8 and 10, by a two pole single throw switch 100 having a pair of contacts 102 mounted to the lower edge of arm 62 and a second pair of contacts 104 mounted to the lower edge of the visor body, as shown only in FIG. 10. Pairs of contacts 102 and 104 are made of a spring conductive material such as beryllium copper and are heat staked as indicated at fasteners 105 and 107 to the panel assembly 50 and visor body 26. Conductors 22 and 24 extend through an aperture 25 formed through the visor body and extend through the hollow elbow assembly bracket 20 for coupling to the vehicle's electrical supply system. Switch 100 provides an automatic switch closing by the contacting tips 108 of associated ones of each contact 102 and 104, as illustrated in FIG. 10, when panel assembly 50 is pivoted, as indicated by arrow A, to an open position. When panel 50 is stored, contacts 102 move away from contacts 104 to automatically interrupt the electrical current path through bulbs 85.

To provide guide and support means for the controlled motion of the panel assembly 50 between the closed position, illustrated in FIG. 1, and the open position, illustrated in FIG. 3, guide means, as best seen in FIGS. 4 and 6, are provided and include an arcuate slot 58 integrally formed in rear surface 56 of frame 52. Slot 58 is defined by a floor 59 and integral sidewalls 61 and 63. Extending within the arcuate guide slot 58 is a guide pin 27 which extends inwardly from the inner rear surface 28 of the visor body and is fixed with relationship to the visor body. As panel assembly 50 pivots about pivot pin 64, therefore, guide slot 58 which circumscribes pin 27 travels within the visor body guided by pin 27 to stabilize and control motion of panel assembly 50 as it is moved between the closed and open positions.

In order to hold the panel assembly in the closed position, as shown in FIG. 1, a latch assembly 110 is mounted to the lower right corner of the mirror assembly and includes a latching dog 112 controlled by push-button actuator 114 to selectively and lockably engage aperture 37 formed in recess 36 in the visor body. The latching mechanism 110 can be substantially indentical to that disclosed in the above identified U.S. Pat. No. 4,486,819.

It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows:

1. A vehicle visor comprising:
   a visor body defining a recess with at least an open edge at the lower edge of said visor body for access to said recess;
   a mirror panel having a mirror on one side, said panel shaped to fit within said recess; and
   means for pivotally coupling said panel to said visor body for pivotal movement in a plane parallel to the plane of said visor body and between a stored position within said recess and a use position lowered below said visor body, wherein one of said panel or body includes an arcuate slot formed therein and the other of said panel includes a guide pin extending into said slot for guidably controlling the motion of said panel as it moves between said stored and use positions.

2. A vehicle visor comprising:
   a visor body defining a recess with at least an open edge at the lower edge of said visor body for access to said recess;

a mirror panel having a mirror on one side, said panel shaped to fit within said recess; and means for pivotally coupling said panel to said visor body for pivotal movement in a plane parallel to the plane of said visor body and between a stored position within said recess and a use position lowered below said visor body, wherein said mirror panel includes a generally crescent-shaped slot extending between said mirror and said pivot coupling means to provide clearance between said vanity mirror panel assembly and said visor body as said vanity mirror panel assembly is lowered to a use position.

3. A vehicle visor comprising:

a visor body defining a recess with at least an open edge at the lower edge of said visor body for access to said recess;

a mirror panel having a mirror on one side, said panel shaped to fit within said recess; and means for pivotally coupling said panel to said visor body for pivotal movement in a plane parallel to the plane of said visor body and between a stored position within said recess and a use position lowered below said visor body, wherein said vanity mirror panel assembly includes an arcuate guide slot formed therein in a side opposite said mirror and remote from said pivot coupling means and wherein said visor body includes a guide pin extending in said slot to controllably guide the pivotal motion of said vanity mirror panel assembly.

4. A visor for a vehicle comprising:

a visor body including a compartment formed therein, said body including an opening along a lower edge of said body and communicating with said compartment;

a vanity mirror panel assembly shaped to fit within said compartment, said assembly including a rectangular mirror on one side thereof for facing toward the interior of a vehicle with the major axis of the mirror in a generally vertically extending direction when said vanity mirror panel assembly is in a use position; and means for pivotally coupling a lower corner of said vanity mirror panel assembly to a lower corner of said compartment of said visor body and slot means formed in said assembly such that said vanity mirror panel assembly can be pivoted downwardly through said opening on an axis orthogonal to the plane of said visor body for use of said mirror.

5. The apparatus as defined in claim 4 wherein said mirror is elongated with a major axis extending generally vertically when said panel assembly is in a lowered use position.

6. The apparatus as defined in claim 5 wherein said mirror is generally rectangular.

7. The apparatus as defined in claim 6 wherein said vanity mirror panel assembly includes illuminating means positioned adjacent opposite sides of said mirror for directing illumination outwardly therefrom to facilitate use of said mirror in low ambient light conditions.

8. The apparatus as defined in claim 7 wherein said illumination means are elongated and extend along sides of said mirror which are generally vertical when said mirror is in the use position.

9. The apparatus as defined in claim 8 wherein said illumination means includes a plurality of lamps and circuit means for coupling said lamps to a vehicle's electrical supply system.

10. The apparatus as defined in claim 9 wherein said circuit means includes switch means positioned on one of said visor body or said vanity mirror panel assembly to be actuated when said vanity mirror panel assembly is pivoted to a lowered use position for supplying electrical power to said lamps.

11. The apparatus as defined in claim 4 wherein said one of said vanity mirror panel assembly or visor body includes a releasable latch for releasably locking said vanity mirror panel assembly in a stored position within said visor body compartment.

12. The apparatus as defined in claim 4 wherein said vanity mirror panel assembly includes illumination means extending along at least one edge of said mirror for providing illumination therefor.

13. A visor for a vehicle comprising:

a visor body including a compartment formed therein, said body including an opening along a lower edge of said body and communicating with said compartment;

a vanity mirror panel assembly shaped to fit within said compartment, said assembly including a mirror on one side thereof for facing toward the interior of a vehicle when said vanity mirror panel assembly is in a use position; and means for pivotally coupling a lower segment of said vanity mirror panel assembly to a lower segment of said compartment of said visor body such that said vanity mirror panel assembly can be pivoted downwardly through said opening on an axis orthogonal to the plane of said visor body for use of said mirror, wherein said vanity mirror panel assembly includes a generally crescent-shaped slot extending between said mirror and said pivot coupling means to provide clearance between said vanity mirror panel assembly and said visor body as said vanity mirror panel assembly is lowered to a use position.

14. A visor for a vehicle comprising:

a visor body including a compartment formed therein, said body including an opening along a lower edge of said body and communicating with said compartment;

a vanity mirror panel assembly shaped to fit within said compartment, said assembly including a mirror on one side thereof for facing toward the interior of a vehicle when said vanity mirror panel assembly is in a use position; and means for pivotally coupling a lower segment of said vanity mirror panel assembly to a lower segment of said compartment of said visor body such that said vanity mirror panel assembly can be pivoted downwardly through said opening on an axis orthogonal to the plane of said visor body for use of said mirror, wherein said vanity mirror panel assembly includes an arcuate guide slot formed therein in a side opposite said mirror and remote from said pivot coupling means and wherein said visor body includes a guide pin extending in said slot to controllably guide the pivotal motion of said vanity mirror panel assembly.

15. A visor for a vehicle comprising:

a visor body including a panel receiving recess;

a vanity mirror panel assembly shaped to fit within said recess, said assembly including a mirror on one side thereof facing the interior of a vehicle when said vanity mirror panel assembly is in a use position; and means for pivotally coupling said vanity mirror panel assembly to said storage compartment of said visor body such that said vanity mirror panel assembly can be pivoted downwardly through said opening on an axis orthogonal to the plane of said visor body placing said mirror below said visor body for use of said mirror, wherein said vanity mirror panel assembly includes an arcuate guide slot formed therein in a side opposite said mirror and remote from said pivot coupling means and wherein said visor body includes a guide pin extending in said slot to controllably guide the pivotal motion of said vanity mirror panel assembly.

16. The apparatus as defined in claim 15 wherein said vanity mirror panel assembly includes a generally crescent-shaped slot extending between said mirror and said pivot coupling means to provide clearance between said vanity mirror panel assembly and said visor body as said vanity mirror panel assembly is lowered to a use position.

17. The apparatus as defined in claim 16 wherein said vanity mirror panel assembly includes illuminating means positioned adjacent opposite sides of said mirror for directing illumination outwardly therefrom to facilitate use of said mirror in low ambient light conditions.

18. The apparatus as defined in claim 17 wherein said illumination means are elongated and extend along sides of said mirror which are generally vertical when said mirror is in the use position.

19. The apparatus as defined in claim 18 wherein said illumination means includes a plurality of lamps and circuit means for coupling said lamps to a vehicle's electrical supply system.

20. The apparatus as defined in claim 19 wherein said circuit means includes switch means positioned on one of said visor body or said vanity mirror panel assembly to be actuated when said vanity mirror panel assembly is pivoted to a use position for supplying electrical power to said lamps.

21. The apparatus as defined in claim 20 wherein said one of said vanity mirror panel assembly or visor body includes a releasable latch for releasably locking said vanity mirror panel assembly in a stored position within said visor body storage compartment.

22. The apparatus as defined in claim 21 wherein said mirror is elongated with a major axis extending generally vertically when in a lowered use position.

23. The apparatus as defined in claim 22 wherein said mirror is generally rectangular.

* * * * *